US012572445B2

(12) United States Patent
Li et al.

(10) Patent No.: US 12,572,445 B2
(45) Date of Patent: Mar. 10, 2026

(54) METHODS, ELECTRONIC DEVICES AND STORAGE MEDIA FOR EXECUTING ASSERTIONS

(71) Applicant: XEPIC Technology (Beijing) Co., LTD., Beijing (CN)

(72) Inventors: Yingqing Li, Chengdu (CN); Jianda Ge, Shanghai (CN); Jiawei Yin, Nanjing (CN)

(73) Assignee: XEPIC Technology (Beijing) Co., LTD., Beijing (CN)

( * ) Notice: Subject to any disclaimer, the term of this patent is extended or adjusted under 35 U.S.C. 154(b) by 262 days.

(21) Appl. No.: 18/404,485

(22) Filed: Jan. 4, 2024

(65) Prior Publication Data

US 2024/0241809 A1     Jul. 18, 2024

(30) Foreign Application Priority Data

Jan. 18, 2023     (CN) .......................... 202310101195.8

(51) Int. Cl.
*G06F 9/44*          (2018.01)
*G06F 11/3604*     (2025.01)

(52) U.S. Cl.
CPC ............................... *G06F 11/3608* (2013.01)

(58) Field of Classification Search
CPC .................................................. G06F 11/3608
See application file for complete search history.

(56) References Cited

U.S. PATENT DOCUMENTS

| | | | | | |
|---|---|---|---|---|---|
| 7,926,020 | B1 * | 4/2011 | Lu | ........................... | G06F 30/30 |
| | | | | | 716/136 |
| 10,657,307 | B1 * | 5/2020 | Jain | ..................... | G06F 30/3323 |
| 2008/0098366 | A1 * | 4/2008 | Fong | ................... | G06F 30/3308 |
| | | | | | 717/135 |
| 2017/0161403 | A1 * | 6/2017 | Mustafa | ................ | G06F 30/333 |
| 2020/0042697 | A1 * | 2/2020 | Gauthier | ............. | G06F 11/3636 |

* cited by examiner

*Primary Examiner* — Qamrun Nahar
(74) *Attorney, Agent, or Firm* — ANOVA LAW GROUP, PLLC

(57) ABSTRACT

A method for executing an assertion includes obtaining a description of the assertion that includes a plurality of events to be verified, determining a plurality of states of the assertion according to the plurality of events to be verified, generating a data structure according to the description where the data structure includes timing information, initializing the data structure at runtime to generate a state transition table that includes a plurality of state numbers determined according to the timing information and a plurality of transition types corresponding to the plurality of states and respectively correspond to executable transition functions each for one of the plurality of states, and executing the executable transition functions based on the state transition table to determine an execution result of the assertion.

17 Claims, 8 Drawing Sheets

300

```
unsigned long assert_sm_info_top_0[] ={

0,  98,  DescriptorCommon::SVA_NODE_SIG,  0,  stmt1,  3,  3, 0,  99,  DescriptorCommon:: SVA_NODE_SIG,  1,  0,  2,  5, 0,  100,  DescriptorCommon:: SVA_NODE_SIG,  2,  0,  0,  0, 0,  101,  DescriptorCommon:: SVA_NODE_SIG,  3,  0,

| idx | node_type | trans_type | check_addr | match_func_addr | spawn_idx | offending_str |
|---|---|---|---|---|---|---|
| 0 | SVANodeType::SVA_NODE_SI | CHECK_TRANS | 0x7ffff08469aa | 0x7ffff08469as | -1 | a |
| 1 | ' | TRANS_ONLY | (nil) | (nil) | -1 | ' |
| 2 | ' | TRANS_ONLY | (nil) | (nil) | -1 | ' |
| 3 | SVANodeType::SVA_NODE_SI | CHECK_TRANS | 0x7ffff08469ab | (nil) | -1 | b |
| 4 | ' | TRANS_ONLY | (nil) | (nil) | -1 | ' |
| 5 | ' | TRANS_SPAWN | (nil) | (nil) | 8 | ' |
| 6 | ' | TRANS_SPAWN | (nil) | (nil) | 8 | ' |
| 7 | ' | TRANS_SPAWN | (nil) | (nil) | 8 | ' |
| 8 | SVANodeType::SVA_NODE_SI | CHECK_DELAY | 0x7ffff08469ac | (nil) | -1 | c |
| 9 | SVANodeType::SVA_NODE_SI | CHECK_MATCH | 0x7ffff08469ad | (nil) | -1 | d |

"pv.sv", 27: top.p1: started at 7s failed at 7s

Offending 'a'

"pv.sv", 27: top.p1: started at 5s failed at 11s

Offending 'b'

"pv.sv", 27: top.p1: started at 1s failed at 17s

Offending 'c'

"pv.sv", 27: top.p1: started at 3s failed at 19s

Offending 'd'

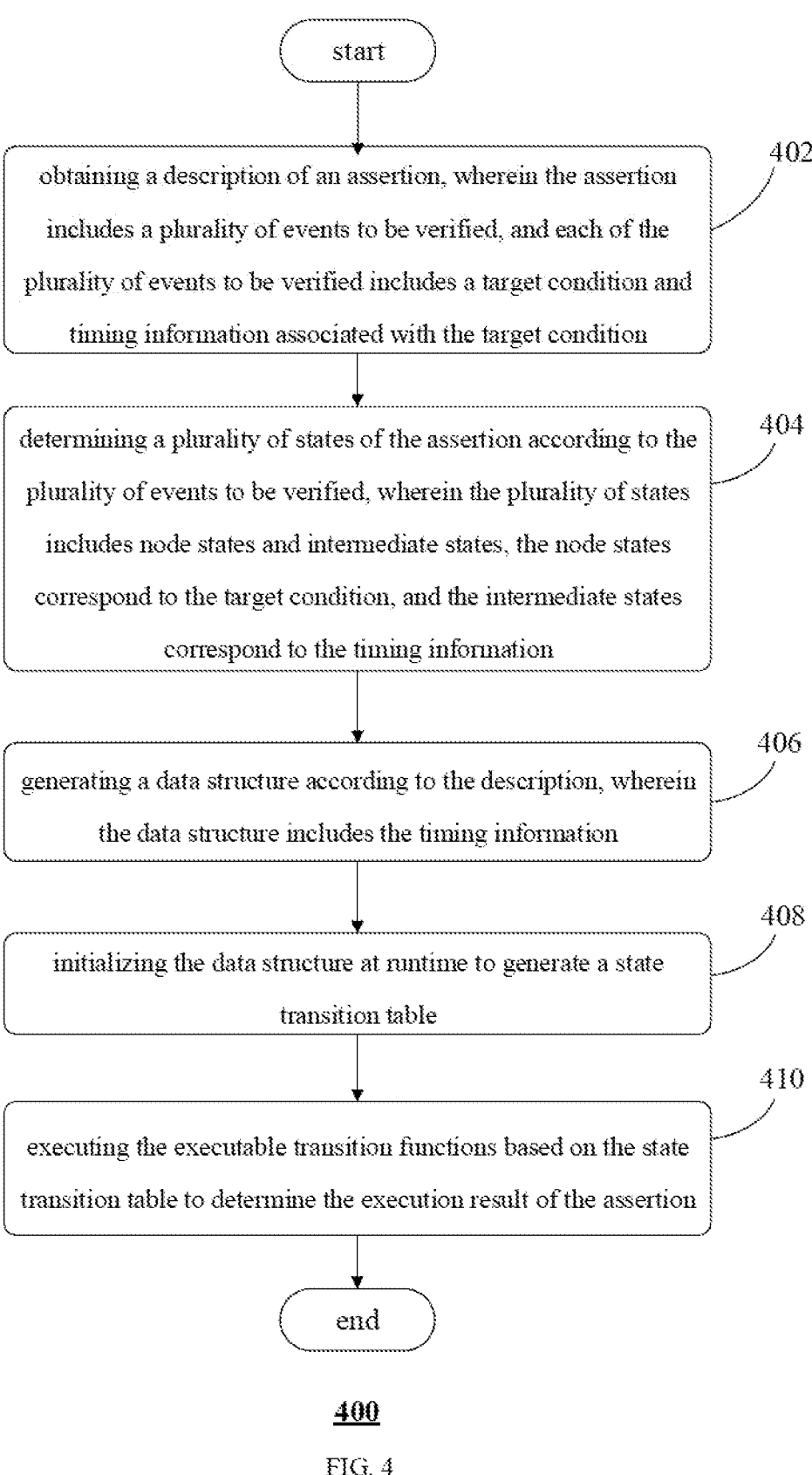

start obtaining a description of an assertion, wherein the assertion includes a plurality of events to be verified, and each of the plurality of events to be verified includes a target condition and timing information associated with the target condition — 402 determining a plurality of states of the assertion according to the plurality of events to be verified, wherein the plurality of states includes node states and intermediate states, the node states correspond to the target condition, and the intermediate states correspond to the timing information — 404 generating a data structure according to the description, wherein the data structure includes the timing information — 406 initializing the data structure at runtime to generate a state transition table — 408 executing the executable transition functions based on the state transition table to determine the execution result of the assertion — 410 end

METHODS, ELECTRONIC DEVICES AND STORAGE MEDIA FOR EXECUTING ASSERTIONS

CROSS REFERENCE TO RELATED APPLICATION

The application claims the benefits of priority to Chinese Application No. 202310101195.8, filed Jan. 18, 2023, which is incorporated herein in its entirety.

TECHNICAL FIELD

The present disclosure relates to the technical field of computer software, in particular to a method, an electronic device, and a storage medium for executing assertions.

BACKGROUND

In the field of verifying integrated circuits, simulation generally refers to compiling a logic system design and running the logic system design on a computer to simulate and test various functions of the logic system design. The logic system design can be, for example, the design of an application-specific integrated circuit (ASIC) or a System-On-Chip (SOC). Therefore, the design tested or verified in the simulation can also be invoked the Design Under Test (DUT).

In Verilog syntax, assertion is a very useful syntax for verification. Assertions can allow a user to enter conditions to be monitored, and provide corresponding reports when the conditions are satisfied. Generally, assertions are compiled along with the logic system design in a compilation manner. For example, while compiling an assertion, a transition function needs to be generated for each state of the assertion.

Because assertions can be very complex, assertions can have many states. This results in taking a lot of time to compile assertions. A verification project often involves a large number of assertions. How to speed up the compilation of assertions without affecting the execution speed has become an urgent technical problem to be solved.

SUMMARY

In accordance with the disclosure, there is provided a method, an electronic device, and a storage medium for executing assertions.

A first aspect of the present application provides a method for executing assertions, the method comprising: obtaining a description of an assertion, wherein the assertion includes a plurality of events to be verified, and each of the plurality of events to be verified includes a target condition and timing information associated with the target condition; determining a plurality of states of the assertion according to the plurality of events to be verified, wherein the plurality of states includes node states and intermediate states, the node states correspond to the target condition, and the intermediate states correspond to the timing information: generating a data structure according to the description, wherein the data structure includes the timing information: initialize the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond to an executable transition function for each of the plurality of states; and executing the executable transition functions based on the state transition table to determine the execution result of the assertion.

A second aspect of the present disclosure provides an electronic device. The electronic device can include: a memory for storing a set of instructions; and at least one processor configured to execute the set of instructions to cause the electronic device to: obtain a description of an assertion, wherein the assertion includes a plurality of events to be verified, and each of the plurality of events to be verified includes a target condition and timing information associated with the target condition: determine a plurality of states of the assertion according to the plurality of events to be verified, wherein the plurality of states includes node states and intermediate states, the node states correspond to the target condition, and the intermediate states correspond to the timing information: generate a data structure according to the description, wherein the data structure includes the timing information: initialize the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond to an executable transition function for each of the plurality of states; and execute the executable transition functions based on the state transition table to determine the execution result of the assertion.

A third aspect of the present disclosure provides a non-transitory computer-readable that stores a set of instructions that is executable by at least one processor of a computer system to cause the computer system to perform a method for processing video content. The method can include: obtaining a description of an assertion, wherein the assertion includes a plurality of events to be verified, and each of the plurality of events to be verified includes a target condition and timing information associated with the target condition: determining a plurality of states of the assertion according to the plurality of events to be verified, wherein the plurality of states includes node states and intermediate states, the node states correspond to the target condition, and the intermediate states correspond to the timing information: generating a data structure according to the description, wherein the data structure includes the timing information; initializing the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond to an executable transition function for each of the plurality of states; and executing the executable transition functions based on the state transition table to determine the execution result of the assertion.

BRIEF DESCRIPTION OF THE DRAWINGS

To describe the technical solutions in the present disclosure or the prior techniques more clearly, the following will briefly introduce the figures that need to be used in the embodiments or the prior techniques. Obviously, the figures in the following description are merely exemplary, for those ordinary skilled in the field, without inventive work, other figures can be obtained based on these figures.

FIG. 3B illustrates a schematic diagram of an exemplary array according to embodiments of the present disclosure.

FIG. 3C illustrates a schematic diagram of an exemplary state transition table according to embodiments of the present disclosure.

FIG. 3D illustrates a schematic diagram of an exemplary execution result according to embodiments of the present disclosure.

FIG. 4 illustrates a flowchart of an exemplary method for executing assertions according to embodiment of the present disclosure.

DETAILED DESCRIPTION

Figure 1:
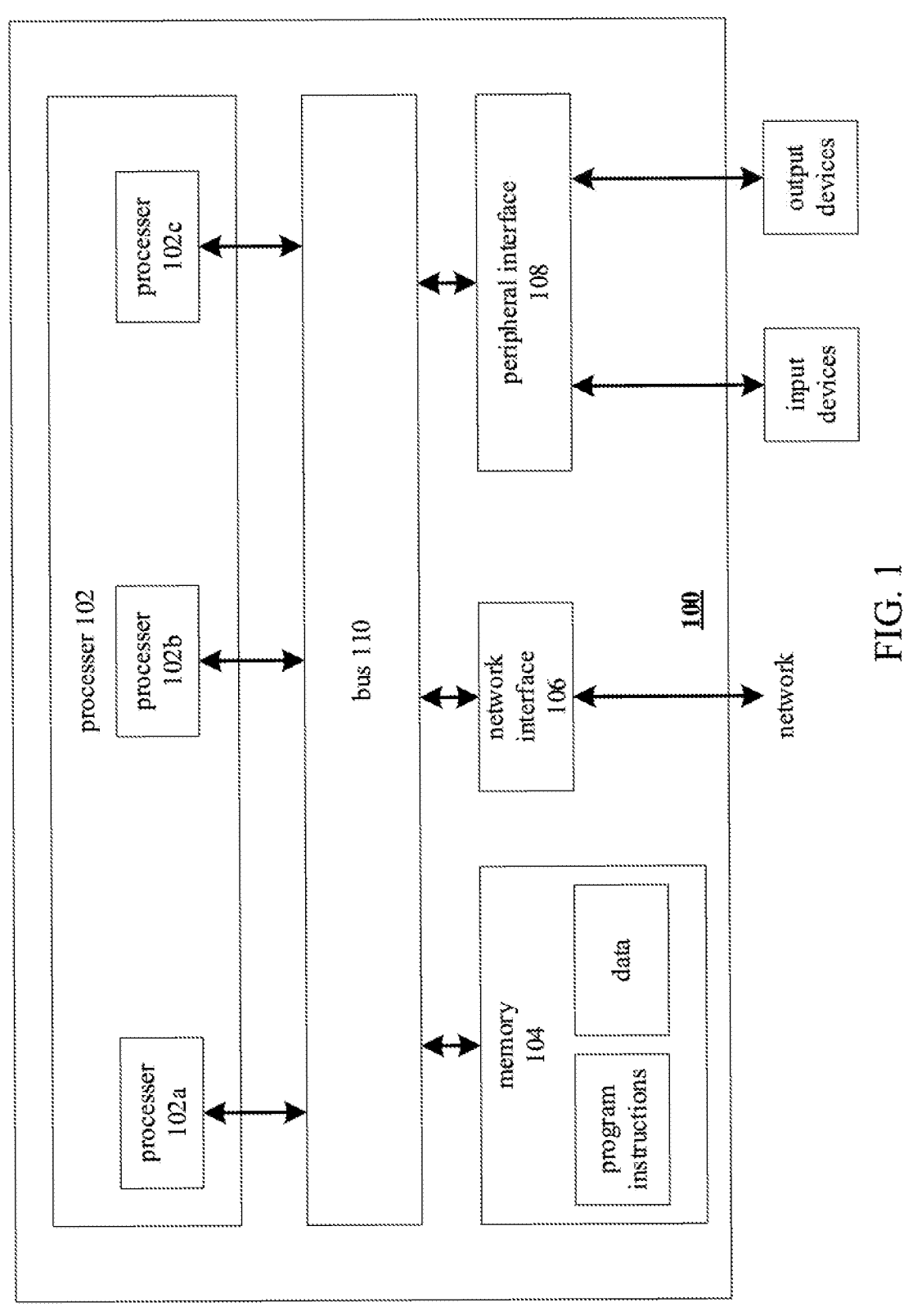
FIG. 1 illustrates a schematic diagram of an exemplary electronic device according to embodiments of the present disclosure.

Exemplary embodiments will be described in detail herein, and examples thereof are shown in the accompanying drawings. In the following description involving the accompanying drawings, the same numerals in different accompanying drawings indicate the same or similar elements, unless specified otherwise. Implementations described in the following exemplary embodiments do not represent all implementations consistent with the disclosure. In contrast, they are merely examples of devices and methods consistent with some aspects of the disclosure as described in detail in the appended claims.

Terms in the disclosure are merely used for describing specific embodiments, rather than limiting the disclosure. Singular forms "a (an)" "said", and "the" used in the present disclosure and the appended claims also include plural forms, unless clearly specified in the context that other meanings are denoted. It should be further understood that the term "and/or" used herein refers to and includes any or all possible combinations of one or more associated items listed.

It should be understood that, although terms such as "first", "second", and "third" can be used to describe various kinds of information in the disclosure, these kinds of information should not be limited by the terms. These terms are merely used to distinguish information of the same type from each other. For example, without departing from the scope of the disclosure, the first information can also be referred to as second information, and similarly, the second information can also be referred to as first information. Depending on the context, the word "if" used herein can be explained as "when . . . ", "as . . . ", or "in response to the determination".

As mentioned above, while compiling an assertion, it is usually necessary to generate transition functions for each state of the assertion. For example, for the assertion "a ##100 b", in 100 clock cycles after the initial state "a", there are 100 states. The simulation system needs to generate 100 specific state transition functions for these 100 states, which greatly increases compilation time. Because assertions can be very complex, assertions can have many states, which causes a lot of time for compiling assertions. A verification design generally involves a large number of assertions. How to speed up the compilation of assertions without affecting the execution speed has become an urgent technical problem to be addressed.

In the 100 states of assertion "a ##100 b", the 1st to 99th states are all the same waiting states, until the 100th state in that the verification operation is performed to determine whether condition "b" is true. Therefore, for the states 1-99, it is not necessary for the simulation tool to spend time generating specific state transition functions for each state. In view of the above, this application provides a method, an electronic device, and a storage medium for executing assertions. By generating a data structure during the compilation process and then generating a state transition table based on the data structure during the execution process, the corresponding executable transition function can be directly invoked to be executed according to the transition functions corresponding to the plurality of states in the state transition table. In this way, the simulation tool reduces time for generating the transition function of each state during the compilation process, shortens the compilation time, and reuses the transition function of identical states.

FIG. 1 illustrates a schematic diagram of an electronic device 100 according to embodiments of the present disclosure. The electronic device 100 can be, for example, a computer host machine. The electronic device 100 can include: a processor 102, a memory 104, a network interface 106, a peripheral interface 108, and a bus 110. The processor 102, the memory 104, the network interface 106, and the peripheral interface 108 are connected to each other within the device 100 through the bus 110.

The processor 102 can be a central processing unit (CPU), an image processor, a neural network processor (NPU), a micro control unit (MCU), a programmable logical device, a digital signal processor (DSP), an application specific integrated circuit (ASIC), or one or more integrated circuits. The processor 102 can perform functions related to the techniques described in the disclosure. In some embodiments, the processor 102 can also include a plurality of processors integrated into a single logical component. As shown in FIG. 1A, the processor 102 can include a plurality of processors 102a, 102b, and 102c.

The memory 104 can be configured to store data (e.g., an instruction set, computer codes, intermediate data, and the like). As shown in FIG. 1A, the stored data can include program instructions (e.g., program instructions used to implement the simulation method of the present disclosure) and the data to be processed (e.g., the memory 104 can store temporary codes generated during compiling). The processor 102 can also access stored program instructions and data and execute the program instructions to operate the data to be processed. The memory 104 can include a non-transitory computer-readable storage medium, such as a volatile storage device or a non-volatile storage device. In some embodiments, the memory 104 can include a random-access memory (RAM), a read-only memory (ROM), an optical disk, a magnetic disk, a hard disk, a solid-state disk (SSD), a flash memory, a memory stick, and the like.

The network interface 106 can be configured to enable the electronic device 100 to communicate with other external devices via a network. The network can be any wired or wireless network capable of transmitting and receiving data. For example, the network can be a wired network, a local wireless network (e.g., a Bluetooth network, a Wi-Fi network, a near field communication (NFC), or the like), a cellular network, the Internet, or a combination of the above. It is appreciated that the type of network is not limited to the above specific examples. In some embodiments, the network interface 106 can include any number of network interface controllers (NICs), radio frequency modules, receivers, modems, routers, gateways, adapters, cellular network chips, or random combinations of two or more of the above.

The peripheral interface 108 can be configured to connect the electronic device 100 to one or more peripheral devices to implement input and output information. For example, the peripheral devices can include input devices, such as keyboards, mice, touch pads, touch screens, microphones, various sensors, and output devices, such as displays, speakers, vibrators, and indicator lights.

The bus 110, such as an internal bus (e.g., a processor-storage bus), an external bus (e.g., a USB port, a PCI-E bus), and the like, can be configured to transmit information among various components (e.g., the processor 102, the memory 104, the network interface 106, and the peripheral interface 108) of the electronic device 100.

It should be noted that, although the above device merely illustrates the processor 102, the memory 104, the network interface 106, the peripheral interface 108, and the bus 110, the device can also include other components necessary for normal operations. In addition, it can be appreciated for those ordinary skilled in the art that the foregoing devices can also include the components necessary to implement the solutions of embodiments of the present disclosure and do not require to include all the components of figures.

Figure 2A:
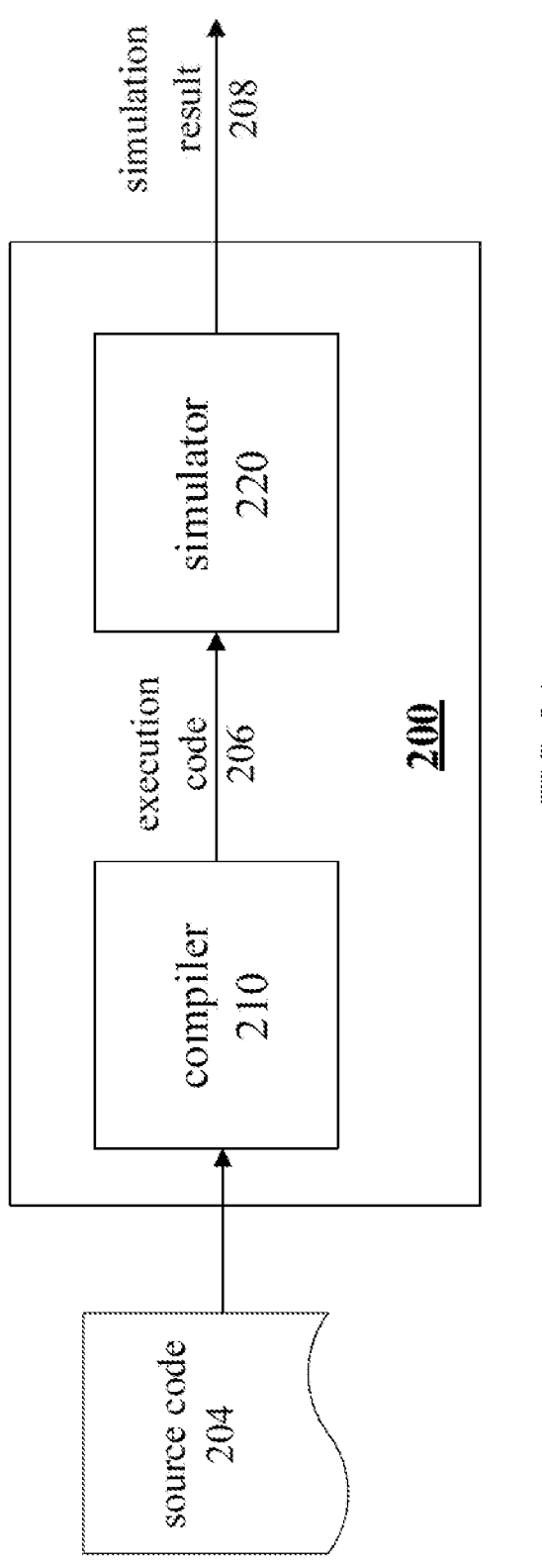
FIG. 2A illustrates a schematic diagram of an exemplary simulation tool according to embodiments of the present disclosure.

FIG. 2A illustrates a schematic diagram of an exemplary simulation tool 200 according to embodiments of the present disclosure.

In the field of chip design, simulation tools can usually be used to simulate a logic system design. The simulation tool can be, for example, GalaxSim simulation tool provided by XEPIC Corporation Limited. The exemplary simulation tool 200 shown in FIG. 2A can include a compiler 210 and a simulator 220. The compiler 210 can receive the source code 204 (e.g., in hardware description language such as VHDL, Verilog, System Verilog, and etc.) and compile it into execution code 206 (e.g., machine code, assembly code, software code, etc.). It is appreciated that the description of the logic system design can be described in hardware description language (HDL), register transfer level (RTL) language, binary code, assembly code, or machine code, etc. The simulator 220 can perform simulation according to the execution code 206 and output the simulation result 208. For example, simulation tool 200 can output the simulation results 208 to an output device (e.g., displaying on a display) via the peripheral interface 108 of FIG. 1.

Figure 2B:
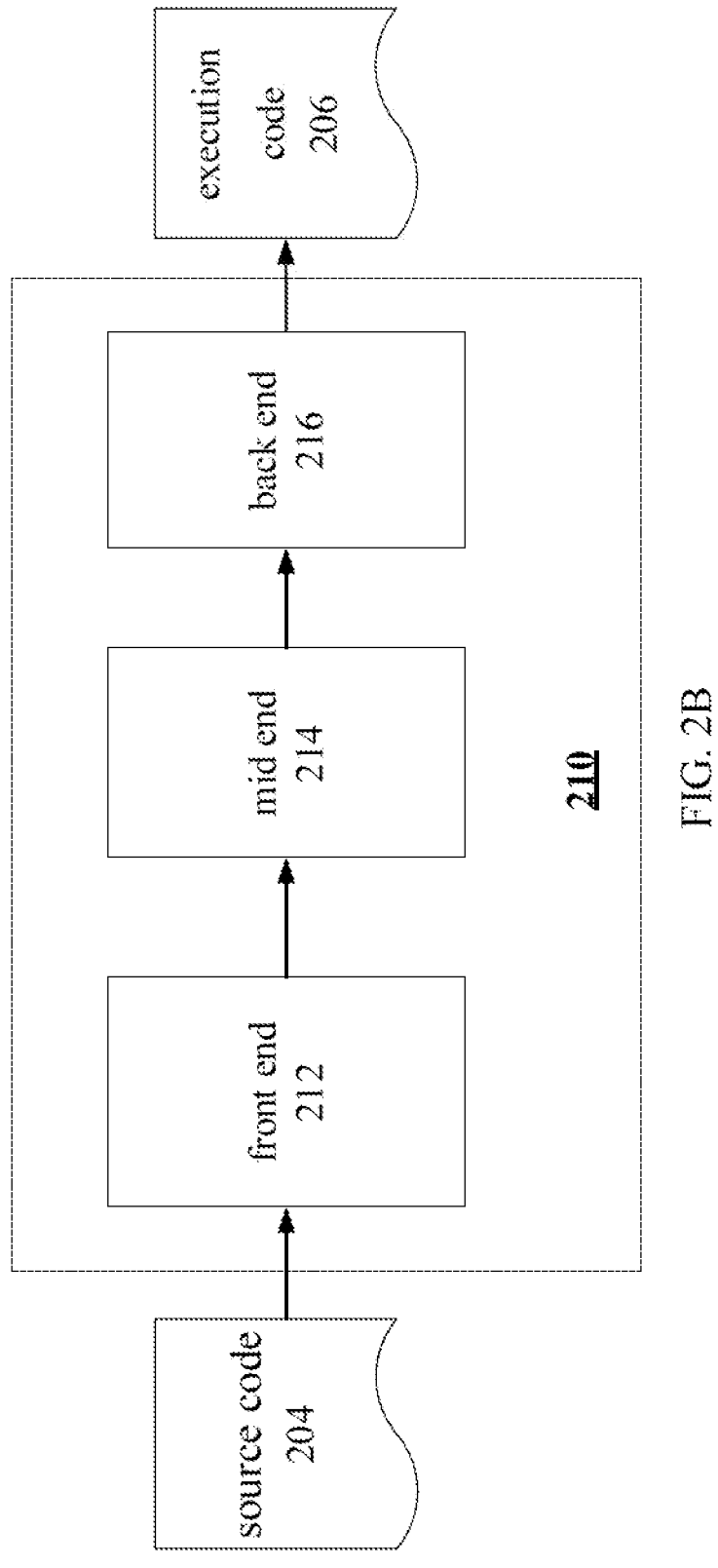
FIG. 2B illustrates a schematic diagram of an exemplary compiler according to embodiments of the present disclosure.

FIG. 2B illustrates a schematic diagram of the compiler 210 according to embodiments of the present disclosure. As shown in FIG. 2B, the compiler 210 can include a front end 212, a mid end 214, and a back end 216.

The front end 212 can be used to analyze the lexicon, syntax, and semantics of the source code according to a specific source language.

After the lexical, grammatical, and semantic analysis of the source code is completed, the mid end 214 can convert the source code into an intermediate representation (or an intermediate code) and can optimize the intermediate representation. An intermediate language (or an intermediate code) is an equivalent internal representation of the source code that is syntax-oriented and can be easily translated into a target program. Its understandability and ease of generating executable code lie between source code and executable code. Commonly used intermediate codes include reverse Polish representation, quaternary expression, ternary expression and tree representation. For example, the mid end 214 can remove unused code, remove inaccessible code, clear unused variables, etc. Optimization can include machine-dependent optimization and machine-independent optimization. Among them, machine-related optimization, for example, can be the optimization of the test platform (Testbench, TB), and can use some characteristics of the test platform to help optimization. Machine-independent optimization can, for example, be optimization of the Design Under Test (DUT). The optimized intermediate representation can then be passed to the backend 126 for further processing.

The back end 216 can further optimize the intermediate representation and generate execution code based on the architecture of a target processor (e.g., the processor 102 of FIG. 1). Generally, the execution code is machine code.

It is understood that the structure of a compiler is not limited to the example of FIG. 2B. For example, the front end 212 and the mid end 214 can be collectively referred to as the front end of the compiler.

The compiler 210 can generate execution code based on the computer code to be compiled. Computer code to be compiled (e.g., a logic system design) can also be referred to as source code. Typically, the source language in which source code is programmed is a high-level programming language. The high-level programming language can be a software programming language or a hardware programming language as mentioned above. The execution code can be, for example, assembly code, machine code, etc. Typically, the compiler 210 can be stored in the memory 104 shown in FIG. 1 and executed by the processor 102 to compile the logic system design into execution code. The compiler 210 can convert the description of the logic system design from a high-level language description (e.g., HDL language) to a lower-level description (e.g., RTL language or binary code) so that the hardware can run the logic system design.

Figure 3A:
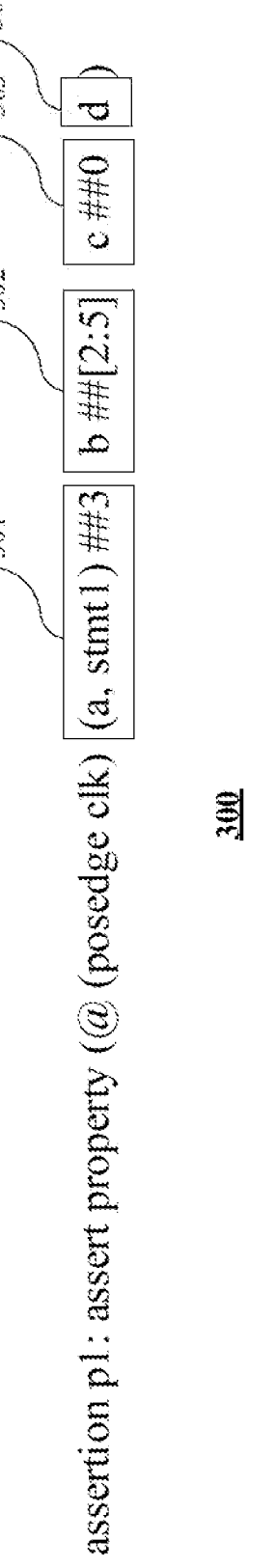
FIG. 3A illustrates a schematic diagram of an exemplary assertion according to embodiments of the present disclosure.

FIG. 3A illustrates a schematic diagram of an exemplary assertion 300 according to embodiments of the present disclosure.

The assertion 300 is described as follows.

assertion p1: assert property (@ (posedge clk) (a, stmt1) ##3 b ##[2:5] c ##0d)

The simulation tool 200 can obtain the description of the assertion 300. The assertion 300 can indicate that, when a rising edge of a first cycle of a current clock signal comes, whether signal "a" is true can be verified. In response to the signal "a" being true, the simulation tool 200 can execute a target function stmt 1. In the case where the signal "a" is true, (i.e., the verification passes), whether the signal b is true can be verified when a rising edge of a next 3rd clock cycle (i.e., the fourth clock cycle) comes. In the case where signal "b" is true, whether signal "c" is true can be verified when one of the rising edges of the next 2-5 clock cycles (i.e., the sixth to ninth clock cycles) comes. In the case where signal "c" is true, whether signal "d" is true can be verified within the same clock cycle.

It should be noted that, for the sixth to ninth clock cycles, the simulation tool 200 can verify whether the signal "c" is true when the rising edge of the sixth clock cycle comes. The simulation tool 200 may not perform verification when the rising edge of the sixth clock cycle comes, but verify whether the signal "c" is true when the rising edge of the seventh clock cycle comes. Similarly, the simulation tool 200 can also verify whether the signal "c" is true when the rising edge of the eighth or ninth clock cycle comes.

In this way, the simulation tool 200 can have four verification processes in parallel, such as, verifying whether the signal "c" is true when the rising edge of the sixth clock cycle comes: performing no verification when the rising edge of the sixth clock cycle comes, and verifying whether the signal "c" is true when the rising edge of the seventh clock cycle comes: performing no verification when the rising edge of the sixth-seventh clock cycle comes, and verifying whether the signal "c" is true when the rising edge of the eighth clock cycle comes: or, performing no verification when the rising edge of the sixth-eighth clock cycle comes, and verifying whether the signal "c" is true when the rising edge of the ninth clock cycle comes. That is, the simulation tool 200 can continue to verify the signal d as long as it verifies that the signal c is true when the rising edge of one of the sixth to ninth clock cycles comes. In response to the signal "c" being false in the four parallel verification processes, the simulation tool 200 can then determine that the signal "c" is false.

As shown in FIG. 3A, the assertion 300 can include events 301-304 to be verified. Among them, the event 301 to be verified can include a target condition. The target condition can be that the signal a is true. The event 301 to be verified can include the timing information of delaying the processing of the next event 302 to be verified by 3 cycles after verifying that the signal "a" is true. The event 302 to be verified can include the target condition that signal "b" is true and the timing information for delaying 2-5 clock cycles. The event 303 to be verified can include a target condition of the event "c" being true and the timing information for processing the next event 304 to be verified within the same clock cycle. The event 304 to be verified is the last event to be verified in the assertion 300, so the event 304 to be verified can only include the target condition that event "d" is true.

The simulation tool 200 can determine a plurality of states of the assertion 300 based on the events 301-304 to be verified. The plurality of states can include node states and intermediate states. The node states can correspond to the target conditions. For example, verifications of whether signals "a," "b," "c," and "d" being true can include 4 node states. The intermediate states can correspond to the timing information. For example, after verifying that the signal "a" is true, there is a delay of 3 cycles before continuing to process the event 302 to be verified. At this moment, first and second cycles after verifying the signal "a" are the time in a waiting state. The intermediate state can refer to the waiting state. Meanwhile, the assertion 300 can include 6 intermediate states. In other words, the assertion 300 can include a total of 10 states.

The simulation tool 200 can generate a data structure based on the description of the assertion 300. In some embodiments, the data structure can be an array structure.

FIG. 3B illustrates a schematic diagram of an exemplary array 310 according to embodiments of the present disclosure.

The array 310 can include 4 rows of content, respectively corresponding to the events 301-304 to be verified. The array 310 can include timing information of the assertion 300.

As shown in FIG. 3B, the first row of the array 310 corresponds to the event 310 to be verified. The row can contain 7 elements. Among the seven elements, the second element "98" can be the address offset of the signal "a." The third element "DescriptorCommon::SVA_NODE_SIG" can indicate that the node state type is a verification signal value. The last two elements "3,3" of the row can indicate that the node state has a minimum delay of 3 and a maximum delay of 3. The minimum delay and the maximum delay can be determined based on the timing information "##3" of the event 301 to be verified. Similarly, the second row of array 310 corresponds to the event 302 to be verified. The "99" in this row can be the address offset of the signal "b". The last two elements "2,5" can indicate that the node state has a minimum delay of 2 and a maximum delay of 5. The minimum delay and the maximum delay can be determined based on the timing information "##[2:5]" of the event 302 to be verified. The unit of the delay can be a cycle.

In some embodiments, a verification result of an event to be verified can be true or false. When the verification result is false, the simulation tool 200 can determine that the assertion is in an assertion failure state. At this time, the simulation tool 200 can output information when the verification fails so as to inform the user of the reasons for the assertion failure. That is, the assertion failed because the verification result of which event to be verified is false. The fourth element of the array can be an index of the output information when the verification result of the event to be verified is false.

In some embodiments, the event to be verified of an assertion can also include a target function that needs to be executed if the target condition is satisfied. For example, the event 301 to be verified can include a description of "(a, stmt1)". This description can indicate that: after the simulation tool 200 verifies that the signal "a" is true, the target function "stmt1" is executed. Here, the target function "stmt1" can be the fifth element of a row of the corresponding array (for example, the fifth element of the first row is stmt1). As another example, in FIG. 3B, the fifth element in the second row of the array 310 is "0", which means that the simulation tool 200 only needs to verify whether the signal "b" is true, and does not need to perform other operations.

In some embodiments, an assertion can involve a plurality of clock signals, and the first element of each row of the array can indicate which clock signal the corresponding event to be verified is based on. That is to say, the first element can be a clock signal index for a scenario having a plurality of clock signals.

It is understood that the data structure may not be in the form of the above array. For example, a data structure can be a table, or a plurality of variables related to each other, etc.

The simulation tool 200 can initialize the certain data structure at runtime to generate a state transition table.

FIG. 3C illustrates a schematic diagram of an exemplary state transition table 320 according to embodiments of the present disclosure.

According to the above-determined 10 states of the assertion 300, the state transition table 320 can include 10 state numbers 0-9 corresponding to these 10 states. The state numbers 0-9 can be, for example, represented by the column 1 "idx" of the state transition table 320. The state number can be determined based on the timing information. For example, the $0^{th}$ state can be the state of whether the verification signal "a" in the event 301 to be verified is true: the 1st and 2nd states can be the waiting states represented by "##3": the 3rd state can be the state of whether the verification signal "b" in the event 302 to be verified is true: the fourth-seventh states can be the 4 states determined based on "##[2:5]"; the eighth state can be the state of whether the verification signal "c" in event 303 to be verified is true; and the ninth state can be the state of whether the verification signal "d" of the event 304 to be verified is true based on "##0".

The state transition table 320 can also include transition types respectively corresponding to these 10 states (for example, represented by the third column "trans_type" of the state transition table 320). These transition types correspond to the executable transition functions of these 10 states, respectively. For example, executable transition functions can include: "CHECK_TRANS", "TRANS_ONLY", "TRANS_SPAWN", "CHECK_DELAY0", or "CHECK_MATCH".

In some embodiments, the simulation tool 200 can determine state types corresponding to numbers 0-9 respectively. The state types can be displayed in the second column "node_type" of the state transition table 320. For example, the 0th, 3rd, eighth, and ninth states can be node states, respectively corresponding to whether the verification signals "a," "b," "c," and "d" are true. The node states type can be "SVANodeType::SVA_NODE_SIG", indicating that the signal (SIG) value is verified. The simulation tool 200 can determine the addresses of the node states as "0x7ffff08469aa", "0x7ffff08469ab", "0x7ffff08469ac", and "0x7ffff08469ad" based on the address offsets of the signals "a," "b," "c," and "d", respectively, in the array 310. Because the intermediate state can be a waiting state without actual operations, the address of the intermediate state can be empty (i.e., "nil"). These address offsets can be displayed in column 4 "check_addr" of the state transition table 320.

The simulation tool 200 can determine that the 1st-2nd and the 4th-7th states can be intermediate states. Among them, the 4th-7th states can be determined based on the timing information "##[2:5]". The timing information "##[2:5]" can instruct the simulation tool 200 to delay execution of the event 303 to be verified by 2 clock cycles, or 3 clock cycles, or 4 clock cycles, or 5 clock cycles after verifying that the signal b is true. In other words, the event of verifying whether the signal c is true can be executed in the 5th state, or in the 6th state, or in the 7th state, or in the 8th state. Therefore, the three states 5, 6, and 7 can be connected with separate state transitions, one state transition is transition to the next state, and the other state transition is transition directly to the eighth state to verify whether the signal c is true. The simulation tool 200 can determine that the transition values of the three states 5-7 are "8".

For sequential execution, the default transition value can be set for states that do not need any transitions. For example, the default transition value for states 0-4 and 8-9 is "−1". It is appreciated that "−1" is merely an example. In practical applications, users can define the default transition value to directly transit to the next state. These transition values can be displayed in the 6th column "spanwn_idx" of the state transition table 320.

As shown in FIG. 3C, the executable transition function corresponding to the 0th state can be "CHECK_TRANS". The "CHECK_TRANS" function corresponding to the 0th state can be configured to verify whether the signal a is true, and transit to the 1st state in response to the signal a being true: or, in response to the signal a being false, the simulation tool 200 can determine that the assertion 300 is in an assertion failure state. The executable transition function corresponding to the 1st or 2nd state can be "TRANS_ONLY". The "TRANS_ONLY" function corresponding to the 1st state can be configured to transit to the 2nd state: the "TRANS_ONLY" function corresponding to the 2nd state can be configured to transit to the 3rd state. The executable transition function corresponding to the 3rd state can be "CHECK_TRANS". The "CHECK_TRANS" function corresponding to the 3rd state can be configured to verify whether the signal b is true and transit to the fourth state in response to the signal b being true: or, in response to the signal b being false, the simulation tool 200 can determine that the assertion 300 is in an assertion failure state. The executable transition function corresponding to the fourth state can be "TRANS_ONLY". The "TRANS_ONLY" function corresponding to the fourth state can be configured to transit to the fifth state. The executable transition function corresponding to the fifth state can be "TRANS_SPAWN". The "TRANS_SPAWN" function corresponding to the fifth state can be configured to transit to the sixth state and the eighth state indicated by a transition value of 8. Similarly, the executable transition function corresponding to the sixth and seventh states can be "TRANS_SPAWN". The "TRANS_SPAWN" functions corresponding to states 6 and 7 can be configured to transit to the next state and the eighth state indicated by a transition value of 8. The executable transition function corresponding to the eighth state can be "CHECK_DELAY0". The "CHECK_DELAY0" function corresponding to the eighth state can be configured to verify that signal c is true, and in response to signal c being true, transit to the ninth state and process the ninth state within the current clock cycle: or, in response to signal c being false, the simulation tool 200 can determine that the assertion 300 is in an assertion failure state. It should be noted that, as shown in FIG. 3A, in response to the signal c being false in the four parallel verification processes corresponding to the timing information "##[2:5]", the simulation tool 200 can determine that the signal c is false. The executable transition function corresponding to the ninth state can be "CHECK_MATCH". The "CHECK_MATCH" function corresponding to the ninth state can be configured to verify whether signal d is true, and in response to signal d being true, the simulation tool 200 can determine that the assertion 300 is in an assertion match state: or in response to signal d being false, the simulation tool 200 can determine that the assertion 300 is in an assertion failure state. The last event to be verified in the assertion 300 is to verify whether signal d is true. Therefore, the executable transition function corresponding to the last state in the state transition table 320 is no longer "CHECK_TRANS" or "CHECK_DELAY0", but "CHECK_MATCH", which means that this state is the last state of the assertion 300.

In some embodiments, the first row in the array 310 corresponding to the event 301 to be verified can include the target function "stmt1". The simulation tool 200 initializes the array 310 at runtime to generate the state transition table 320 and can further determine the address of the target function corresponding to the 0th state (for example, as indicated by the column "match_func_addr" in the state transition table 320). For states where the target function does not need to be executed (for example, states 1-9), the simulation tool 200 can determine that the addresses of the target functions of these states are empty (i.e., "nil").

In some embodiments, the state transition table 320 can include names of a plurality of states, for example, as indicated by "offending_str" of the state transition table 320. The names of the 0th, 3rd, 8th, and 9th states can be named "a", "b", "c", and "d" respectively. These names can be output when the assertion 300 fails, so as to clarify which failure of the event to be verified caused the assertion 300 to be in an assertion failure state. It can be understood that the state transition table 320 can only include the name of node states. For intermediate states 1-2 and 4-7, because no verification process but the state transition is performed, the intermediate states generally do not cause the assertion 300 to be in a failure state.

The simulation tool 200 can execute the executable transition function for each state based on the state transition table 320. The simulation tool 200 can execute transitable functions sequentially according to numbers 0-9. When a state with a transition value is encountered during execution, the simulation tool 200 can transit to the corresponding state according to the transition value.

FIG. 3D illustrates a schematic diagram of an exemplary execution result according to embodiments of the present disclosure.

In some embodiments, in response to the assertion 300 being in the assertion failure state, the simulation tool 200 can output the time of the assertion failure state and the name of the state. As shown in FIG. 3D, rows 1-2 of the execution result 330 can indicate that the simulation tool 200 starts executing the assertion 300 at 7 s. Based on the state transition table 320, the simulation tool 200 can verify whether the signal a is true. In response to the signal a being false, the simulation tool 200 can determine that the assertion 300 is in a failure state at a time point of 7 s, and simultaneously output the name "a" of the 0th state at this time. In this way, based on the output, the user can know that the assertion 300 starts execution at 7 s, and because the signal a is false, the assertion 300 is in an assertion failure state at 7 s.

Similarly, rows 3-4 of the execution result 330 can indicate that the simulation tool 200 starts executing the assertion 300 at 5 s. The clock period for assertion 300 can be 2 s. According to the state transition table 320, the simulation tool 200 can verify whether the signal a is true at 5 s. In response to signal a being true, the simulation tool 200 can enter the third state (i.e., 11 s) after experiencing the 1st and 2nd states (i.e., 7-10 s) to verify whether signal b is true. In response to the signal b being false, the simulation tool 200 can determine that the assertion 300 is in a failed state at the time point of 11 s, and simultaneously output the name "b" of the third state at this time. In this way, based on the output, the user can know that the assertion 300 starts executing at 5 s, and because signal b is false, the assertion 300 is in an assertion failure state at 11 s.

It should be noted that the simulation tool 200 can start executing the assertion 300 at any point in time. As shown in FIG. 3D, the simulation tool 200 can start executing the assertion 300 at Is (e.g., rows 5-6 of the execution result 330), or 3 s (e.g., rows 7-8 of the execution result 330), or 5 s (e.g., rows 3-4 of the execution result 330), or 7 s (e.g., rows 1-2 of the execution result 330). The simulation tool 200 can output the end time corresponding to the start time, and the name of the failure state.

In this way, the simulation tool generates a certain data structure during the compilation process, and then generates a state transition table based on the certain data structure during the execution process. According to the transition functions corresponding to the plurality of states in the state transition table, the corresponding executable transition function is directly invoked for execution. In this way, the simulation tool 200 reduces the time required to generate the transition function for each state during the compilation process, thereby shortening the compilation time.

Because the executable transition function can include some general state transition functions, and the transition functions of such general states are often limited. For example, the five executable transition functions mentioned above are "CHECK_TRANS", "TRANS_ONLY", "TRANS_SPAWN", "CHECK_DELAY0", and "CHECK_MATCH". Therefore, users can write and compile these functions into binary executable files in advance and store them in a transition function library. The simulation tool 200 can directly invoke and reuse these general state transition functions during the execution of the assertion 300. Because the above functions are executable binary files, they can be reused without compiling again, which improves the efficiency of assertion compilation.

This application provides a method, an electronic device, and a storage medium for executing assertions. By generating a data structure during the compilation process, and then generating a state transition table based on the data structure during the execution process, the corresponding executable transition function can be directly invoked to execute according to the transition functions corresponding to the plurality of states in the state transition table. In this way, the simulation tool reduces the time to generate the transition function of each state during the compilation process, shortens the compilation time, and reuses the transition function of the general state.

FIG. 4 illustrates a flowchart of an exemplary method 400 for executing assertions according to embodiments of the present disclosure. The method 400 can be executed by the electronic device 100 shown in FIG. 1, more specifically, by a simulation tool running on the electronic device 100 (for example, the simulation tool 200 shown in FIG. 2A). The method 400 can include the following steps.

At step 402, the simulation tool 200 can obtain a description of an assertion (e.g., the assertion 300 in FIG. 3A), wherein the assertion includes a plurality of events to be verified (e.g., the events 301-304 to be verified in FIG. 3A), each of the plurality of events to be verified includes a target condition (e.g., the signals a, b, c, d being true in FIG. 3A) and timing information (e.g., "##3", "##[2:5]", and "##0" in FIG. 3A) associated with the target condition.

At step 404, the simulation tool 200 can determine a plurality of states of the assertion (e.g., the 10 states in FIG. 3C) according to the plurality of events to be verified, wherein the plurality of states includes node states (e.g., the 4 node states in FIG. 3C) and intermediate states (e.g., the 6 intermediate states in FIG. 3C), the node states corresponding to the target conditions, and the intermediate states corresponding to the timing information.

At step 406, the simulation tool 200 can generate a data structure according to the description, wherein the data structure includes the timing information.

In some embodiments, the data structure can be an array structure (e.g., the array 310 in FIG. 3B).

In some embodiments, the simulation tool 200 can determine an address offset (e.g., the second elements "98", "99", "100", "101" of each row of array 310 in FIG. 3B) and node state type (e.g., the third element "DescriptorCommon:: SVA_NODE_SIG" in each row of array 310 in FIG. 3B) of the node state according to the target condition. The simulation tool 200 can determine a minimum delay (e.g., the sixth elements "3", "2", "0" in rows 1-3 of array 310 in FIG. 3B) and a maximum delay (e.g., the last elements "3", "5", "0" in rows 1-3 of array 310 in FIG. 3B) of the node state based on the timing information.

At step 408, the simulation tool 200 can initializing the data structure at runtime to generate a state transition table (e.g., the state transition table 320 in FIG. 3C). The state transition table includes a plurality of state numbers (e.g., the numbers 0-9 shown in the first column "idx" of the state transition table 320 in FIG. 3C) and a plurality of transition types (e.g., the third column "trans_type" of the state transition table 320 in FIG. 3C) corresponding to the plurality of states. The plurality of state numbers can be determined according to the timing information, and the plurality of transition types can respectively correspond to executable transition functions (e.g., "CHECK_TRANS", "TRAN- S_ONLY", "TRANS_SPAWN", "CHECK_DELAY0", or "CHECK_MATCH" in FIG. 3C) each for one of the plurality of states.

In some embodiments, the simulation tool 200 can determine the plurality of state types (e.g., the column 2 "node_type" of the state transition table 320 in FIG. 3C) corresponding to the plurality of state numbers, the plurality of transition types, the addresses of the node states (e.g., the column 4 "check_addr" of the state transition table 320 in FIG. 3C), and the plurality of transition values (e.g., the column 6 "spanwn_idx" of the state transition table 320 in FIG. 3C).

In some embodiments, each of the plurality of events to be verified (e.g., the event 301 to be verified in FIG. 3A) can further include a target function (e.g., the "stmt1" in FIG. 3A) executed when the target condition (e.g., the "a" in FIG. 3A) is satisfied. The data structure can also include the target function (e.g., the fifth element "stmt1" in the first row of array 310 in FIG. 3A). The simulation tool 200 can determine addresses of the plurality of target functions corresponding to the plurality of states (e.g., the column 5 "match_func_addr" in the state transition table 320 in FIG. 3C).

At step 410, the simulation tool 200 can execute the executable transition functions based on the state transition table to determine the execution result of the assertion (e.g., the execution result 330 shown in FIG. 3D).

In some embodiments, the simulation tool 200 can execute the plurality of executable transition functions based on the plurality of state numbers (e.g., the numbers 0-9 in FIG. 3C) and the plurality of transition values (e.g., the transition value "8" corresponding to states 5-7 in FIG. 3C) corresponding to the plurality of state numbers.

In some embodiments, the executable transition function for each of the plurality of states can include a first function (e.g., "CHECK_TRANS"), a second function (e.g., "TRANS_ONLY"), a third function (e.g., "TRANS_SPAWN"), a fourth function (e.g., "CHECK_DELAY0"), and a fifth function (e.g., "CHECK_DELAY0"). The first function (e.g., "CHECK_TRANS") can be configured to verify a target condition (e.g., verify the signal a is true) for the state (e.g., the 0th state). In response to the target condition being satisfied, the first function can transit the state to a next state of the state (e.g., the transition to state 1); or, in response to the target condition being not satisfied, the simulation tool 200 can determine that the assertion is in an assertion failure state. The second function (e.g., "TRANS_ONLY") can be configured to transit the state (e.g., the state 1) to a next state (e.g., the state 2). A third function (e.g., "TRANS_SPAWN") can be configured to transit the state (e.g., the fifth state) to a next state (e.g., the sixth state) and to a state (e.g., the state 8) indicated by the transition value (e.g., the transition value "8"). A fourth function (e.g., "CHECK_DELAY0") can be configured to verify the target condition (e.g., verify that signal c is true) of the state (e.g., the state 8). In response to the target condition being satisfied, the fourth function can transit the state to a next state (e.g., state 9); or, in response to the target condition being not satisfied, the simulation tool 200 can determine that the assertion is in an assertion failure state. A fifth function (e.g., "CHECK_MATCH") can be configured to verify a target condition (e.g., verify that signal d is true) for the state (e.g., the state 9). In response to the target condition being satisfied, the simulation tool 200 can determine that the assertion is in an assertion match state: or, in response to the target condition being not satisfied, the simulation tool 200 can determine that the assertion is in an assertion failure state.

In some embodiments, the state transition table can further include names of the plurality of states (e.g., the last column "offending_str" of the state transition table 320 in FIG. 3C). In response to the assertion being in the assertion failure state, the simulation tool 200 can output time of the assertion failure state (e.g., the "7 s" in row 1 of the execution result 330 in FIG. 3D) and the name (e.g., the "a" in row 2 of execution result 330 in FIG. 3D).

Because the executable transition function can include some general state transition functions, and the transition functions of such general states are often limited. For example, the five executable transition functions mentioned above are "CHECK_TRANS", "TRANS_ONLY", "TRANS_SPAWN", "CHECK_DELAY0", and "CHECK_MATCH". Therefore, users can write and compile these functions into binary executable files in advance and store them in a transition function library. The simulation tool 200 can directly evoke and reuse these general state transition functions during the execution of the assertion 300. Because the above functions are executable binary files, they can be reused without compiling again, which improves the efficiency of assertion compilation.

This application provides a method, an electronic device, and a storage medium for executing assertions. By generating a data structure during the compilation process, and then generating a state transition table based on the data structure during the execution process, the corresponding executable transition function can be directly invoked to execute according to the transition functions corresponding to the plurality of states in the state transition table. In this way, the simulation tool reduces the time to generate the transition function of each state during the compilation process, shortens the compilation time, and reuses the transition function of the general state.

It should be noted that, the method of the present disclosure can be executed by a single device, for example, a computer, a server, and the like. The method of the embodiments can also be applied in a distributed scenario and be implemented by a plurality of devices which can cooperate with each other. In the distributed scenario, one of the plurality of devices can only perform one or more steps in the method of the present disclosure, and the plurality of devices will interact with each other to implement the method.

The embodiments of the present disclosure also provide an electronic device. The electronic device includes: a memory for storing a set of instructions; and at least one processor configured to execute the set of instructions to perform the method as described above.

The computer-readable medium in the present disclosure includes permanent and non-permanent storage media for storing computer instructions that can implement the above method when executed. The storage medium, for example, include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM, digital versatile disc (DVD) or other optical storage, magnetic cassettes, magnetic tape magnetic disk storage or other magnetic storage devices or any other non-transmission media can be used to store information that can be accessed by computing devices.

The specific embodiments of the present disclosure are described above. Other embodiments are within the scope of the claims. In some circumstances, the actions or steps in the claims can execute in a different order from the embodiments and still achieve the desired result. In addition, the process depicted in the drawings does not require the specific order or sequential order to achieve the desired results. In some embodiments, multitasking and parallel processing are also possible or can be advantageous.

It can be appreciated for those ordinary skilled in the art: any embodiments discussed above are merely exemplary and do not indicate that the scope of the present disclosure is limited by these embodiments: under the idea of the present disclosure, embodiments or the technical features in different embodiments above can make a combination, the steps can be implemented in any order, and can have different changes in different aspects of the present disclosure as described above, and for brevity, there are not provided in details.

In addition, to simplify the description and discussion, the well-known power source/ground connected to integrated circuit (IC) chips and other components may or may not be shown in the provided drawings. In addition, the devices can be shown in the form of diagrams to avoid making the present disclosure difficult to understand, and this also takes the following facts that the details (that is, the details are understood by those ordinary skilled in the art) of the implementation of these devices in diagrams are highly dependent on the platform which will implement the present disclosure into consideration. Under the circumstance that details (for example, circuits) are described to describe exemplary embodiments of the present disclosure, it is obvious to those skilled in the art that it can be possible to implement the present disclosure without these specific details or upon these specific details are changed.

Although the present disclosure has been described in conjunction with specific embodiments of the present disclosure, the plurality of substitutions, modifications, and variations of these embodiments can be obvious to those skilled in the art according to the foregoing description. For example, other memory architectures (e.g., dynamic RAM (DRAM)) can be used in the discussed embodiments.

The present disclosure is intended to cover all such substitutions, modifications and variations that fall within the broad scope of the appended claims. Therefore, any omission, modification, equivalent replacement, improvement, and the like within the spirit and principle of the present disclosure should be included in the protection scope of the present disclosure.

What is claimed is:

1. A method for executing an assertion, comprising:
obtaining a description of the assertion, wherein the assertion includes a plurality of events to be verified, and each of the plurality of events to be verified includes a target condition and timing information associated with the target condition;
determining a plurality of states of the assertion according to the plurality of events to be verified, wherein the plurality of states include a node state and an intermediate state, the node state corresponds to the target condition, and the intermediate state corresponds to the timing information;
generating a data structure according to the description, wherein the data structure includes the timing information;
initializing the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond to executable transition functions each for one of the plurality of states; and
executing the executable transition functions based on the state transition table to determine an execution result of the assertion.

2. The method according to claim 1, wherein generating the data structure according to the description comprises:
determining an address offset and a node state type of the node state according to the target condition; and
determining a minimum delay and a maximum delay of the node state according to the timing information.

3. The method according to claim 1, wherein initializing the data structure at runtime to generate the state transition table comprises:
determining a plurality of state types, the plurality of transition types, the addresses of the node states, and a plurality of transition values corresponding to the plurality of state numbers.

4. The method according to claim 1, wherein each of the plurality of events to be verified further comprises a target function to be executed when the target condition is satisfied, the data structure further comprises the target function, and initializing the data structure at runtime to generate the state transition table further comprises:
determining addresses of the plurality of target functions corresponding to the plurality of states.

5. The method according to claim 1, wherein executing the executable transition functions based on the state transition table to determine the execution result of the assertion comprises:
executing the plurality of executable transition functions according to the plurality of state numbers and the plurality of transition values corresponding to the plurality of state numbers.

6. The method according to claim 5, wherein the executable transition function for each of the plurality of states comprises:
a first function, configured to:
verify the target condition of the state, and
transit the state to a next state in response to the target condition being satisfied, or determine that the assertion is in an assertion failure state in response to the target condition being not satisfied;
a second function, configured to transit the state to the next state;
a third function, configured to transit the state to the next state and a state indicated by a transition value;
a fourth function, configured to:
verify the target condition of the state, and
transit the state to the next state and process the next state within a current clock cycle in response to the target condition being satisfied, or
determine that the assertion is in the assertion failure state in response to the target condition being not satisfied; or
a fifth function, configured to:
verify the target condition of the state, and
determine that the assertion is in an assertion match state in response to the target condition being satisfied, or determine that the assertion is in the assertion failure state in response to the target condition being not satisfied.

7. The method according to claim 6, wherein the state transition table further comprises names of the plurality of states, and executing the executable transition functions based on the state transition table to determine the execution result of the assertion further comprises:

in response to the assertion being in the assertion failure state, outputting a time and the name of the state when the assertion is in the assertion failure state.

8. The method according to claim 1, wherein the data structure is an array structure.

9. An electronic device for executing an assertion, comprising:

a memory storing a set of instructions; and at least one processor configured to execute the set of instructions to cause the electronic device to:

obtain a description of the assertion, wherein the assertion includes a plurality of events to be verified, and each of the plurality of events to be verified includes a target condition and timing information associated with the target condition;

determine a plurality of states of the assertion according to the plurality of events to be verified, wherein the plurality of states include a node state and an intermediate state, the node state corresponds to the target condition, and the intermediate state corresponds to the timing information;

generate a data structure according to the description, wherein the data structure includes the timing information;

initialize the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond to executable transition functions each for one of the plurality of states; and execute the executable transition functions based on the state transition table to determine an execution result of the assertion.

10. The electronic device according to claim 9, wherein, in generating the data structure according to the description, the at least one processor is configured to execute the set of instruction to cause the electronic device to:

determine an address offset and a node state type of the node state according to the target condition; and determine a minimum delay and a maximum delay of the node state according to the timing information.

11. The electronic device according to claim 9, wherein in initializing the data structure at runtime to generate the state transition table, the at least one processor is configured to execute the set of instruction to cause the electronic device to:

determine a plurality of state types, the plurality of transition types, the addresses of the node states, and a plurality of transition values corresponding to the plurality of state numbers.

12. The electronic device according to claim 9, wherein each of the plurality of events to be verified further comprises a target function to be executed when the target condition is satisfied, the data structure further comprises the target function, and in initializing the data structure at runtime to generate the state transition table, the at least one processor is configured to execute the set of instruction to cause the electronic device to:

determine addresses of the plurality of target functions corresponding to the plurality of states.

13. The electronic device according to claim 9, wherein in executing the executable transition functions based on the state transition table to determine the execution result of the assertion, the at least one processor is configured to execute the set of instruction to cause the electronic device to:

execute the plurality of executable transition functions according to the plurality of state numbers and the plurality of transition values corresponding to the plurality of state numbers.

14. The electronic device according to claim 13, wherein the executable transition function for each of the plurality of states comprises:

a first function, configured to:

verify the target condition of the state, and transit the state to a next state in response to the target condition being satisfied, or determine that the assertion is in an assertion failure state in response to the target condition being not satisfied, a second function, configured to transit the state to the next state;

a third function, configured to transit the state to the next state and a state indicated by a transition value;

a fourth function, configured to:

verify the target condition of the state, and transit the state to the next state and process the next state within a current clock cycle in response to the target condition being satisfied, or determine that the assertion is in the assertion failure state in response to the target condition being not satisfied; or a fifth function, configured to:

verify the target condition of the state, and determine that the assertion is the an assertion match state in response to the target condition being satisfied, or determine that the assertion is in the assertion failure state in response to the target condition being not satisfied.

15. The electronic device according to claim 14, wherein, the state transition table further comprises names of the plurality of states, and in executing the executable transition functions based on the state transition table to determine the execution result of the assertion, the at least one processor is configured to execute the set of instruction to cause the electronic device to:

in response to the assertion being in the assertion failure state, output a time and the name of the state when the assertion is in the assertion failure state.

16. The electronic device according to claim 9, wherein, the data structure is an array structure.

17. A non-transitory computer-readable storage medium that stores a set of instructions for an electronic device that, when executed, the set of instructions cause the electronic device to perform a method for executing an assertion, the method comprising:

obtaining a description of the assertion, wherein the assertion includes a plurality of events to be verified, and each of the plurality of events to be verified includes a target condition and timing information associated with the target condition;

determining a plurality of states of the assertion according to the plurality of events to be verified, wherein the plurality of states include a node state and an intermediate state, the node state corresponds to the target condition, and the intermediate state corresponds to the timing information;

generating a data structure according to the description, wherein the data structure includes the timing information;

initializing the data structure at runtime to generate a state transition table, the state transition table including a plurality of state numbers and a plurality of transition types corresponding to the plurality of states, wherein the plurality of state numbers are determined according to the timing information, and the plurality of transition types respectively correspond an executable transition functions each for one of the plurality of states; and executing the executable transition functions based on the state transition table to determine the execution result of the assertion.

* * * * *